No. 803,515. PATENTED OCT. 31, 1905.
F. L. YOUNG.
RAILWAY SWITCH.
APPLICATION FILED MAR. 8, 1905.
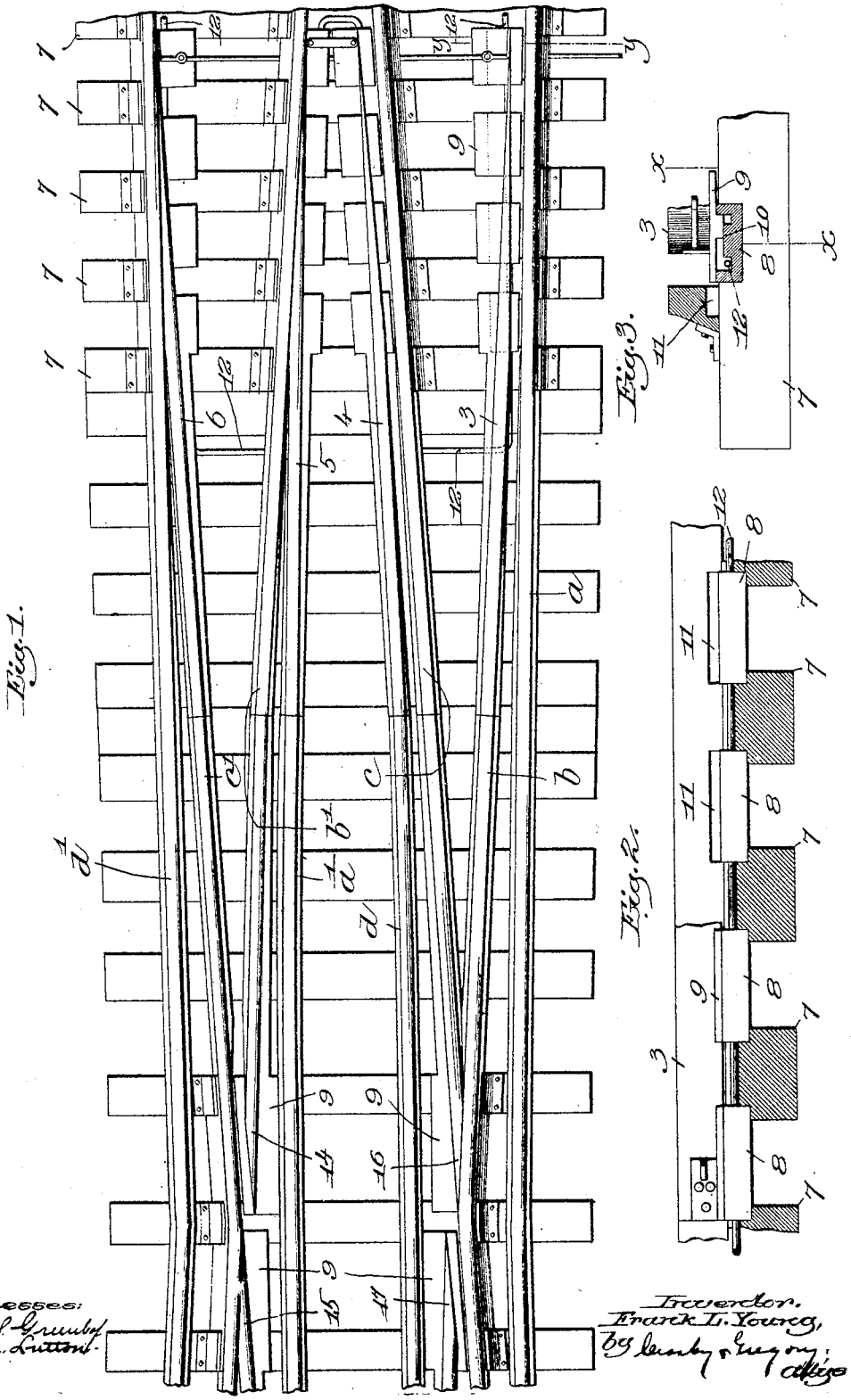

UNITED STATES PATENT OFFICE.

FRANK L. YOUNG, OF BOSTON, MASSACHUSETTS.

RAILWAY-SWITCH.

No. 803,515.  Specification of Letters Patent.  Patented Oct. 31, 1905.

Application filed March 8, 1905. Serial No. 249,037.

*To all whom it may concern:*

Be it known that I, FRANK L. YOUNG, a citizen of the United States, residing at Boston, county of Suffolk, and State of Massachusetts, have invented an Improvement in Railway-Switches, of which the following description, in connection with the accompanying drawings, is a specification, like characters on the drawings representing like parts.

In a copending application, Serial No. 243,784, filed by me February 2, 1905, I have illustrated and described a railway-switch in which the movable switch-rails have secured thereto a plate which rests on and forms the cover of a switch-supporting box adapted to contain a non-freezing lubricant, said cover having a bearing within the box on which it moves back and forth as the switch is thrown. The cover is of such a size that in all of its positions it closes the box, and as the box contains a non-freezing lubricant which may be heated, if desired, it will be impossible for the movable switch-rail to become clogged by ice or snow. The switch illustrated in said application is what might be called a "stub-switch"—that is, one in which the rails of the main line are cut and the movable switch-rail is adapted to be brought into and out of alinement with said main rail.

In a great many locations the "split switch," so called, is employed instead of a stub-switch, and by "split switch" I mean one in which the fixed rail is continuous and the movable switch-rail is tapered to a point at its end and is moved up against the fixed rail or separated therefrom according to whether the switch is open or closed.

In my present invention I have adapted the non-freezing self-lubricating feature of the invention shown in my prior application to a split switch. In accordance with my present invention I place beneath the movable switch-rail one or more switch-supporting boxes, each adapted to contain a non-freezing lubricant, and I secure to the movable switch-rail a plate or cover for each box, each plate having a bearing within the box on which it is supported, said plates moving back and forth on the box with the switch-rail. In order to make provision for the movement of these plates or covers the main or fixed rail is made of special construction, it being provided with one or more boxes or recesses into which the projecting edges of the plates or covers may move as the switch is closed.

Other features of my invention will be more fully described in the subjoined specification and then pointed out in the claims.

Figure 1 is a plan view of a switch or crossing, showing my invention applied thereto. Fig. 2 is a section on the line $xx$, Fig. 3; and Fig. 3 is a section on the line $yy$, Fig. 1.

In order to better show how my invention may be applied to split switches, I have shown it in connection with a combined cross-over and switch—that is, where two tracks cross over each other and at the same time connect with two other side tracks.

In Fig. 1, $a$ and $a'$ constitute the rails of one track, $b$ and $b'$ the two rails of another track, $c$ and $c'$ the rails of a third track, and $d$ and $d'$ the rails of a fourth track. The tracks $b\ b'$ and $c\ c'$ cross each other, and the tracks $a\ a'$ lead off from the tracks $b\ b'$, and the tracks $d\ d'$ lead off from the tracks $c\ c'$. The rails $a$, $c$, $b'$, and $d'$ are shown as continuous fixed rails. The rail $b$ connects with a swinging switch-rail 3, which has a tapered point. The rail $d$ connects with another swinging switch-rail 4. The rail $a'$ connects with a swinging switch-rail 5, and the rail $c'$ connects with a similar switch-rail 6. The swinging switch-rails 3, 4, 5, and 6 are each of them split or pointed, as is usual in a split switch, and are operated by any suitable switch-operating mechanism. (Not shown.) Usually these swinging rails rest and move upon suitable plates or supports spanning the sleepers or ties 7. This type of switch is very susceptible to being clogged by snow or ice, because during a storm the snow will accumulate in the open spaces between the fixed rails and the swinging rails and by the movement of the rails become so packed and frozen as to prevent said pivoted rails from being closed against the fixed rails.

In applying my improvements to this type of switch I place beneath each swinging switch-rail one or more switch-supporting boxes 8, said boxes being herein shown as set into and supported by the ties 7. The upper edge of each box projects slightly above the ties. Extending across the top of each box is a plate or cover 9, which is secured to the movable switch-rail in some suitable way. Said plate or cover preferably rests and moves on a bearing 10 within the box and is wide enough so that it covers the box in either of its two extreme positions. This plate or cover projects beyond the pivoted rail on either side thereof, and in order to accommodate one projecting edge when the switch is closed I have provided each fixed rail with a recess 11, into which the projecting portion of the plate or cover can enter when the switch is closed. In order to give the fixed rail sufficient strength at the point where the recess is formed, I may, if necessary, thicken it more or less, as shown in Fig. 3. These switch-supporting boxes may be arranged in various ways without departing from the invention.

If necessary, each pivoted rail may have a switch-supporting box extending nearly its full length, although I prefer the construction shown in the drawings, in which one or more short and comparatively small boxes are used and placed under each pivoted rail. The number of such small boxes which it is necessary to use may be varied according to the circumstances.

Each box is adapted to contain a suitable non-freezing compound—such, for instance, as an oil which will not freeze. This oil serves as a means for lubricating the bearing of the plates or covers 9, and by keeping the oil hot by some suitable means the movable parts of the switch may be kept free from snow or ice even in extremely cold weather.

Heat may be transmitted to the lubricant in a variety of ways. As herein shown, I have extended through each box a pipe or conduit 12, through which some heating fluid—such, for instance, as oil—may be circulated, such heating fluid giving up its heat upon passing through each box and keeping the oil in the box, and consequently the box, sufficiently warm, so that any snow or ice getting between the main rail and the switch-rail will be melted.

The conduit or pipe through which the oil is circulated is designated by 12, and this will extend from one box to another, and as a large number of boxes may be incorporated in one circuit a single pumping mechanism will suffice for keeping a large number of switches free from ice. It will not be necessary to use the appliances for heating the oil except when it is storming and there is danger of the switches becoming clogged with snow or ice. It will be desirable to use an oil in the pipes 12 which will not congeal or freeze even at very low temperatures, so that the pumping apparatus or other means for forcing the oil through said pipes may be started up at any time regardless of the temperature.

In a switch mechanism, such as shown in Fig. 1, the frogs are provided with movable members 14, 15, 16, and 17. I will also place one or more switch-supporting boxes, such as above described, beneath each of said movable members, and thereby keep the frogs perfectly free and clear from snow and ice.

Various changes in the construction and operation of the device may be employed without departing from the invention.

Having fully described my invention, what I claim as new, and desire to secure by Letters Patent, is—

1. In a switch, a fixed continuous main rail, a pivoted switch-rail having a tapered point, a switch-supporting box beneath said switch-rail, a cover for said box, said cover being secured to and movable with the switch-rail, and a non-freezing lubricant in said box.

2. In a switch, a hollow switch-supporting box, a sliding plate forming a cover for said box in all positions of said plate, bearings within the box for said cover, a continuous fixed rail, and a pivoted switch-rail secured to the cover.

3. In a switch, a hollow switch-supporting box, a sliding plate forming a cover for said box in all positions of said plate, bearings within the box for said cover, a continuous fixed rail, and a pivoted switch-rail secured to the cover, said fixed rail having recesses in its sides to receive the sliding plate or cover when the switch is closed.

4. In a switch, a hollow switch-supporting box, a sliding plate forming a cover for said box in all positions of said plate, bearings within the box for said cover, a continuous fixed rail, and a pivoted switch-rail secured to the cover, said fixed rail being thickened opposite said box, and having a recess in its side to receive the sliding plate or cover when the switch is closed.

5. In a switch, a fixed continuous main rail, a pivoted switch-rail having a tapered point, a switch-supporting box beneath said switch-rail, a cover for said box, said cover being secured to and movable with the switch-rail, a lubricant within said box, and means adapted to heat said lubricant.

In testimony whereof I have signed my name to this specification in the presence of two subscribing witnesses.

FRANK L. YOUNG.

Witnesses:
 LOUIS C. SMITH,
 BERTHA F. HEUSER.